Dec. 20, 1966 L. KRAMER ETAL 3,292,391
BYPASS CONTROL DEVICE FOR AN IMPULSE TOOL
Filed April 1, 1965 4 Sheets-Sheet 1

INVENTORS
LEO KRAMER
REGINALD W. PAULEY
BY Charles J. Worth
AGENT

INVENTORS
LEO KRAMER
REGINALD W. PAULEY
BY Charles J. Worth
AGENT

Dec. 20, 1966  L. KRAMER ETAL  3,292,391
BYPASS CONTROL DEVICE FOR AN IMPULSE TOOL
Filed April 1, 1965  4 Sheets-Sheet 3
FIG. 6
VALVE OPEN
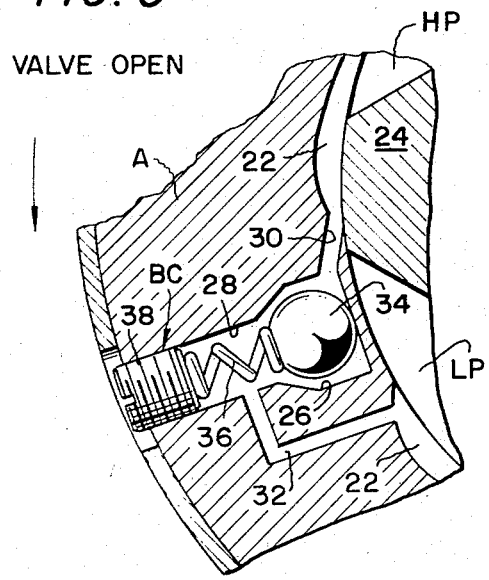
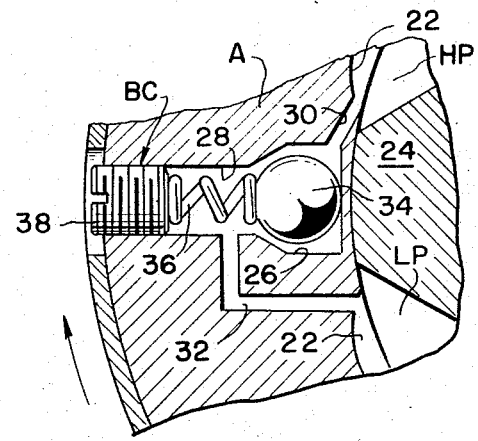
FIG. 7
VALVE OPEN
HOUSING MEANS ACCELERATING
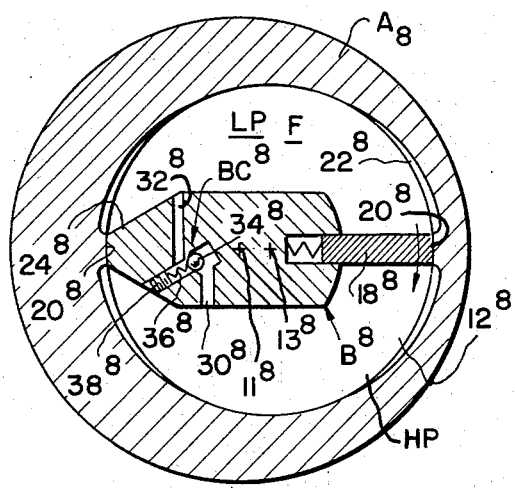
FIG. 8
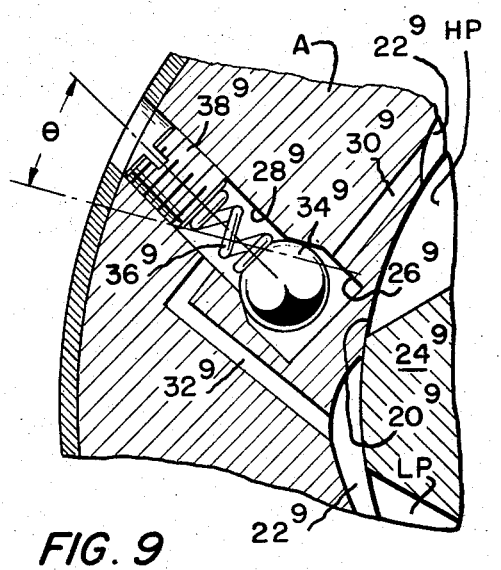
FIG. 9
INVENTORS
LEO KRAMER
REGINALD W. PAULEY
BY Charles J. Worth
AGENT Dec. 20, 1966     L. KRAMER ETAL     3,292,391
BYPASS CONTROL DEVICE FOR AN IMPULSE TOOL
Filed April 1, 1965     4 Sheets-Sheet 4

INVENTORS
*LEO KRAMER*
*REGINALD W. PAULEY*
BY Charles J. Worth
AGENT

United States Patent Office 3,292,391
Patented Dec. 20, 1966

---

3,292,391
BYPASS CONTROL DEVICE FOR AN IMPULSE TOOL
Leo Kramer, Chester, and Reginald W. Pauley, Somerville, N.J., assignors to Ingersoll-Rand Company, New York, N.Y., a corporation of New Jersey
Filed Apr. 1, 1965, Ser. No. 444,600
10 Claims. (Cl. 64—26)

This invention relates to impulse tools and more particularly to a bypass control device for such impulse tools.

Heretofore, control devices have been of the type disclosed in:

| U.S. Patent No. | Issued | Inventor |
| --- | --- | --- |
| 1,996,341 | April 2, 1935 | J. McClelland. |
| 2,010,366 | August 6, 1935 | B. A. Kearns. |
| 2,304,907 | December 15, 1942 | C. C. Goodson, et al. |
| 2,796,789 | June 25, 1957 | H. T. M. Rice, et al. |
| 2,809,734 | October 15, 1957 | C. L. Graybill. |
| 2,986,024 | May 30, 1961 | B. D. Power. |
| 3,116,617 | January 7, 1964 | D. K. Skoog. |

Although a conventional impulse tool such as shown in the above-mentioned U.S. Patent No. 3,116,617 operates satisfactorily, it has been found that the cyclic rate of the impulse tool decreases as the leakage between the housing means and the spindle means decreases and that the maximum torque increases as such leakage decreases. To achieve optimum performance of the impulse tool it is necessary to provide the impulse tool with a device which permits both a high cyclic rate and high maximum torque in the impulse tool.

It is the general object of the present invention to avoid and overcome the foregoing and other difficulties of and objections to prior art practices by the provision of a bypass control device for an impulse tool, which bypass control device:

(1) Substantially reduces delay time between the acceleration phases of successive impulses;

(2) Substantially increases the power output of the impulse tool;

(3) Eliminates the need for induced leakage and short land lengths thereby increasing the maximum torque output of the impulse tool; and (4) Can be controlled to close after a given angular velocity has been attained thereby permitting multi revolution per impulse operation with attendant higher maximum torque output.

The aforesaid objects of the present invention, and other objects which will become apparent as the description proceeds, are achieved by providing a bypass control device for an impulse tool for applying a torque to an object. The impulse tool has housing means provided with a cavity for sealingly containing a fluid, spindle means in the housing means and in the fluid and drive means operatively associated with one of the housing means and the spindle means for causing relative rotary movement between the housing means and the spindle means. The other of the housing means and the spindle means is adapted to engage the object. Sealing means are on one of the housing means and the spindle means. A first sealing portion is on the housing means and a second sealing portion is on the spindle means. The first sealing portion and the second sealing portion are in sealing relation during a relatively small portion of each revolution of the relative rotative movement. The first sealing portion and the second sealing portion and the sealing means are operable during the relatively small portion of each revolution of the relative rotary movement to dynamically seal off the cavity into a high pressure portion and a low pressure portion to produce a primary pressure pulse in the high pressure portion and on the other of the housing means and the spindle means thereby causing the other to rotate with respect to the one of the housing means and the spindle means and to apply a torque to the object. The bypass control device is in one of the housing means and the spindle means and comprises the one being provided with a cavity means and seat means in communication with the cavity means. The one also is provided with passage means for communicating the seat means and the cavity means with the high pressure portion and the low pressure portion.

A centrifugal member is in the cavity means, and biasing means are in the seat means for normally biasing the centrifugal member to the open position. The centrifugal member is operable before and during the primary pressure pulse to overcome the biasing means and to engage the seat means thereby eliminating flow through the passage means, seat means and cavity means. The biasing means are operable at the end of the primary pressure pulse when the biasing force overcomes the pressure force and the centrifugal force to move the centrifugal member away from the seat means thereby permitting flow through the passage means, seat means and cavity means with attendant elimination of bounce backs of the one and providing reduced delay time between primary pressure impulses.

For a better understanding of the present invention reference should be had to the accompanying drawings, wherein like numerals of reference indicate similar parts throughout the several views and wherein:

FIG. 6 is a view similar to FIG. 5 showing the bypass control device in the open position and corresponding to time $t_o$ in FIG. 4;

FIG. 7 is a view similar to FIGS. 5, 6 showing the open bypass control device during the initial portion of the acceleration phase and during the time $t_o$-$t_c$ in FIG. 4;

FIG. 8 is a view similar to FIG. 2 showing the bypass control device in the spindle means; and FIGS. 9–11 are views similar to FIG. 5 of alternative embodiments of the bypass control device.

Although the principles of the present invention are broadly applicable to power tools, the present invention is particularly adapted for use as a bypass control device for impulse tools and hence it has been so illustrated and will be so described.

Figure 2:
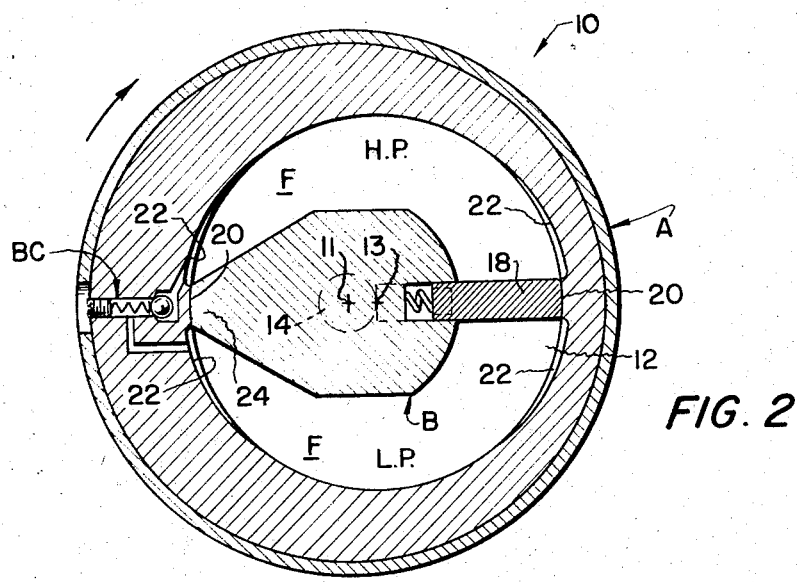
FIG. 2 is a horizontal sectional view taken along the line 2—2 of FIG. 1 in the direction of the arrows.
Figure 1:
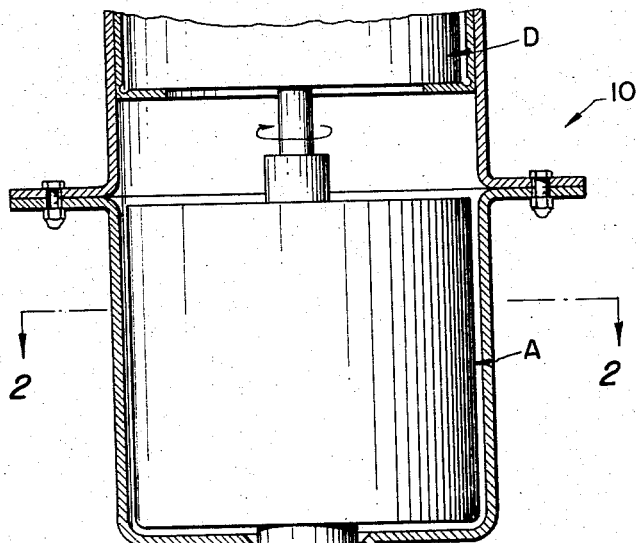
FIG. 1 is a fragmentary side elevational view of an impulse tool wherein the housing means is the driven member and incorporating the bypass control device of the present invention.

With specific reference to the form of the present invention illustrated in the drawings, and referring particularly to FIGS. 1, 2, an impulse tool of the type shown in abovementioned U.S. Patent No. 3,116,617 is indicated generally by the reference numeral 10.

This impulse tool 10 (FIGS. 1, 2) has housing means A (having a center 11) provided with a cavity 12 (having a center 13) for sealingly containing a fluid, such as oil F. Spindle means B (having a center 11) are in the housing means A and in the oil F. Drive means, such as the air or electric motor D (FIG. 1), are connected to one of the housing means A and spindle means B (in this case the housing means A) for causing relative rotary movement between the housing means A and spindle means B. The other of the housing means A and spindle means B (in this case the spindle means B) has a spindle shaft 14 (FIGS. 1, 2) connected by a socket 16 (FIG. 1) to an object, such as the nut N.

Sealing means, such as the spindle blade 18 (FIG. 2), are provided in one of the housing means A and spindle means B (in this case the spindle means B). A first sealing portion, such as the land 20 (FIG. 2), is on the housing means A between undercuts 22 in the housing means A. A second sealing portion, such as the shank portion 24 (FIG. 2), is on the spindle means B.

The lands 20 and shank portion 24 and the spindle blade 18 are operable during a relatively small portion of each revolution of the relative rotary movement between the housing means A and spindle means B to dynamically seal off the cavity 12 into a high pressure portion HP and a low pressure portion LP to produce a primary pressure pulse $P_1$ or $P_2$ (FIG. 4) in the high pressure portion HP and on the spindle means B, thereby causing the spindle means B to rotate with respect to the housing means A and to apply a torque to the nut N.

Figure 3:
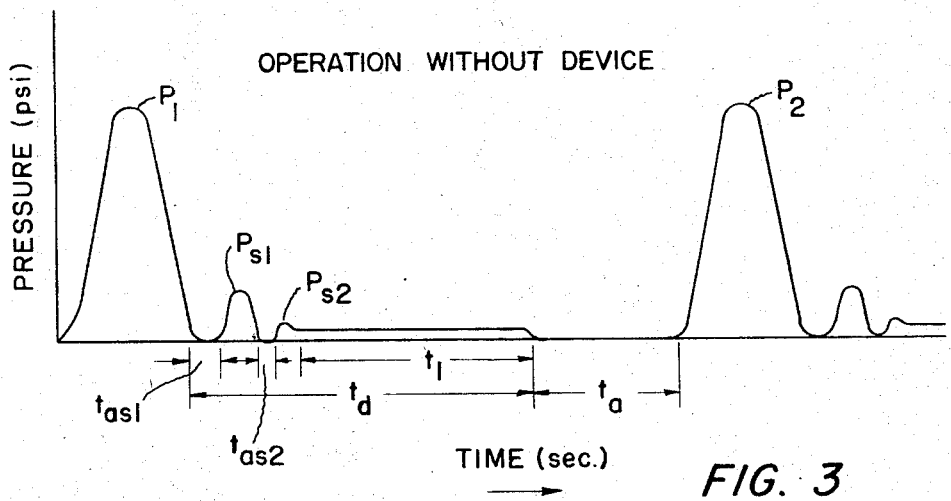
FIG. 3 is a graph of impulse pressure (p.s.i.) vs. time (seconds) showing the operation of a conventional impulse tool.

Referring to FIG. 3, and assuming that the impulse tool 10 does not have a bypass control device, it will be understood that during the acceleration time $t_a$ of the housing means A the land 20 (FIG. 2), the shank portion 24 and spindle blade 18 create the high pressure portion HP and low pressure portion LP in cavity 12. As the pressure increases in high pressure portion HP a primary pressure pulse $P_1$ or $P_2$ is generated. The housing means A slows down rapidly, stops and then bounces back in the opposite relative rotative direction. Thereafter the housing means A again accelerates for a short time ($t_{as_1}$) and moves into the sealing position to produce a secondary pressure pulse $P_{s_1}$. As shown in FIG. 3, the bounce back process is repeated to also produce secondary pressure pulses $P_{s_2}$.

After the last secondary pressure pulse $P_{s_2}$ the housing means A begins to move through the sealing position. The motor D (FIG. 1) is now required to move the housing means A through the sealing position tending to displace oil F from the high pressure portion HP to the low pressure portion LP. Since the displaced oil F must pass through the leakage clearances between the housing means A and the spindle means B, a long time $t_1$ is required to pass through the seal position. If such leakage is zero, the time $t_1$ becomes infinite.

Referring now to FIGS. 4–7 a bypass control device BC of the present invention is used in the impulse tool 10.

Bypass control device

As shown in FIGS. 2, 5–7, the bypass control device BC is disposed in one of the housing means A and spindle means B (in this case the housing means A). The housing means A is provided with cavity means, such as the cavity 26; seat means, such as the seat bore 28 and passage means, such as the passages 30, 32 for communicating the cavity 26 and seat bore 28 with the high pressure portion HP and low pressure portion LP, respectively. A centrifugal member, such as the ball 34, is in the cavity 26. Biasing means, such as the spring 36, are in the seat bore 28 for normally biasing the ball 34 away from the seat bore 28.

Figure 4:
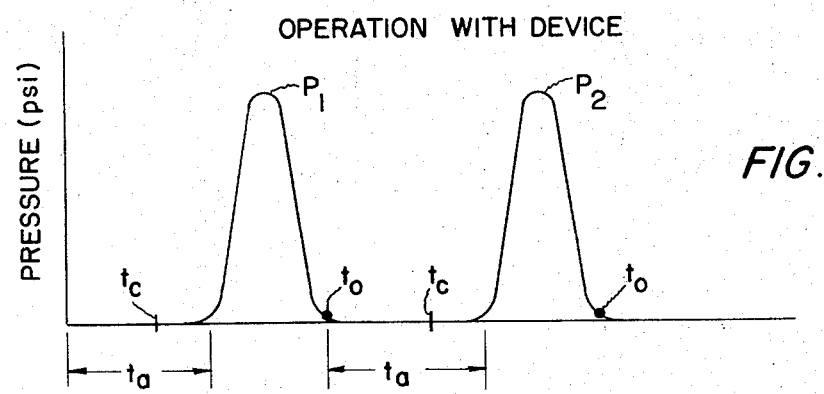
FIG. 4 is a graph similar to FIG. 3 showing the operation of the bypass control device.
Figure 5:
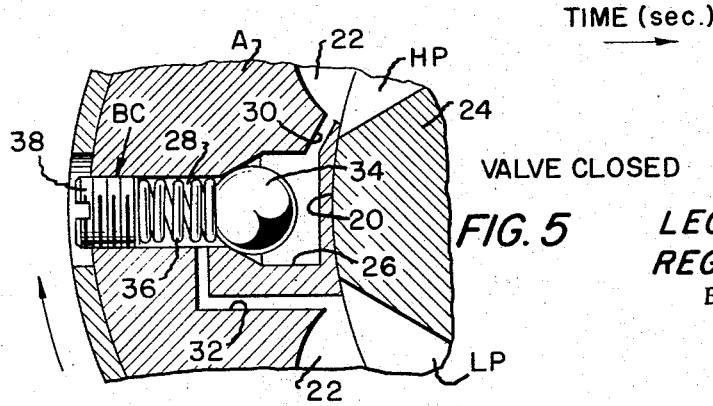
FIG. 5 is an enlarged fragmentary horizontal sectional view showing the bypass control device in the closed position during the primary pressure pulse shown in FIG. 4.

Referring to FIG. 4, during the primary pressure pulse $P_1$ the pressure maintains the ball 34 in the sealing position. At time $t_0$ the centrifugal force on ball 34 (FIG. 5), has overcome the force in spring 36 thereby causing the ball 34 to engage seat bore 28 and eliminating the possibility of flow of oil F through the bypass control device BC. At time $t_0$ (FIG. 4), the housing means A has decelerated and has bounced back to the position shown in FIG. 6 (the pressure having dropped to zero) and the spring 36 has moved the ball 34 to the open position thereby permitting flow of oil F through the bypass control device BC. At time $t_0$ (FIG. 4) the housing means A has slowed down rapidly, stopped and bounced back in the opposite rotative direction as shown in FIG. 6 and the spring 36 has overcome the pressure force and the centrifugal force thereby moving the ball 34 to the open position (FIG. 6) and permitting flow of oil F through the bypass control device BC. After time $t_0$ (FIG. 4) the motor (D) starts to accelerate the housing means A (FIG. 7) through the sealing position with negligible pressure forces and centrifugal forces acting on the ball 34. As a result the bypass control device BC remains open (FIG. 7) permitting the flow of the displaced oil F through the bypass control device BC (rather than the conventional leakage path between the housing means A and the spindle means B) thereby substantially eliminating the delay time $t_d$ (FIG. 3).

For the purpose of providing a positioned closing of the bypass control device BC for a given angular velocity, a positioning means, such as the screw 38, engages the spring 36.

Alternative embodiments

It will be understood by those skilled in the art that alternatively as shown in FIG. 8, the bypass control device $BC^8$ is disposed in the spindle means $B^8$ which is driven in this case.

In FIG. 9 for the purpose of insuring that any deceleration force developed on the ball $34^9$ is applied in a direction to keep the ball $34^9$ against the seat bore $28^9$, such seat bore $28^9$ is inclined at an angle $\theta$ with respect to the land $20^9$.

Figure 10:
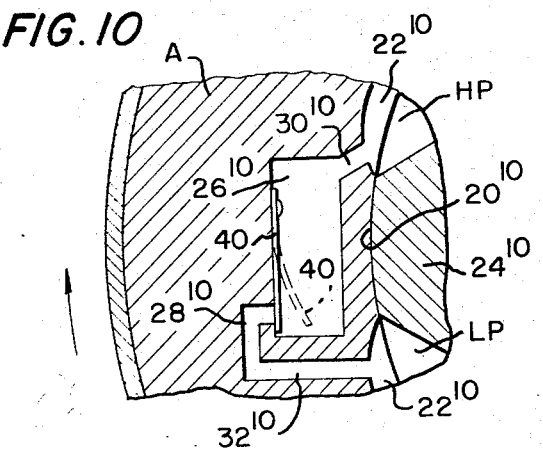

Referring to FIG. 10 a resilient member 40, suitably formed of plastic or metal, is moved by centrifugal force from the dotted line position to the solid line position to engage the seat bore $28^{10}$.

Figure 11:
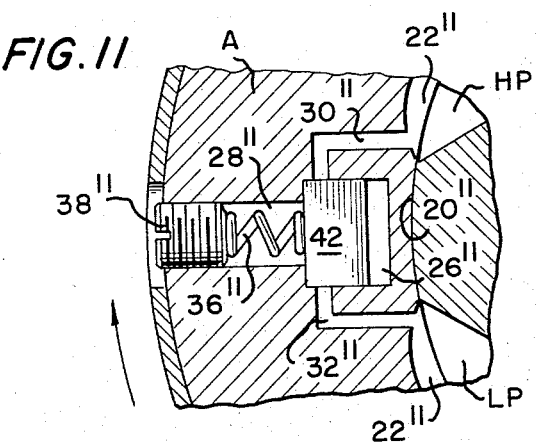

In FIG. 11 a cylindrical piston 42 is employed in the cavity $26^{11}$.

It will be recognized by those skilled in the art that the objects of the present invention have been achieved by providing a bypass control device for an impulse tool, which bypass control device:

(1) Substantially reduces delay time between the acceleration phases of successive impulses;

(2) Substantially increases the power output of the impulse tool;

(3) Eliminates the need for induced leakage and short land lengths thereby increasing the maximum torque output of the impulse tool; and (4) Has a positioned closing for a given angular velocity thereby permitting multi revolution per impulse operation.

While in accordance with the patent statutes preferred and alternative embodiments of the present invention have been illustrated and described in detail, it is to be particularly understood that the invention is not limited thereto or thereby.

We claim:

1. For an impulse tool for applying a torque to an object, said impulse tool having housing means provided with a cavity for sealingly containing a fluid, spindle means in said housing means and in said fluid, drive means operatively associated with one of said housing means and said spindle means for causing relatively rotary movement between said housing means and said spindle means, the other of said housing means and said spindle means being adapted to engage said object, sealing means on one of said housing means and said spindle means, a first sealing portion on said housing means, a second sealing portion on said spindle means, said first sealing portion and said second sealing portion being in sealing relation during a relatively small portion of each revolution of said relative rotative movement, said first sealing portion and said second sealing portion and said sealing means being operable during said relative small portion of each revolution of said relative rotary movement to dynamically seal off said cavity into a high pressure portion and a low pressure portion to produce a primary pressure pulse in said high pressure portion and on said other of said housing means and said spindle means thereby causing said other to rotate with respect to said one of said housing means and said spindle means and to apply a torque to said object; a bypass control device in one of said housing means and said spindle means, said bypass control device comprising:

(a) said one being provided with cavity means and seat means located circumferentially of said cavity means and in communication with said cavity means, (b) said one also being provided with passage means for communicating said seat means and said cavity means with said high pressure portion and said low pressure portion, (c) a centrifugal member in said cavity means and movable by centrifugal force during rotation of said one to a position adjacent said seat means in which position it prevents fluid flow through said seat means, said cavity means, and said passage means, (d) said passage means communicating said cavity means with said high pressure portion to supply fluid from said high pressure portion to said cavity means for retaining said centrifugal member in said position adjacent said seat means, and (e) means in said seat means for biasing said centrifugal member from said seat means to a position permitting fluid flow through said seat means, said cavity means and said passage means.

2. The bypass control device recited in claim 1 wherein said bypass control device is in said housing means.

3. The bypass control device recited in claim 1 wherein said bypass control device is in said spindle means.

4. The bypass control device recited in claim 1 and having positioning means in said one for said biasing means.

5. The bypass control device recited in claim 1 wherein said seat means is aligned with said first sealing portion.

6. The bypass control device recited in claim 1 wherein said seat means is disposed at an angle with respect to said land means.

7. The bypass control device recited in claim 1 wherein said centrifugal member is a spherical member.

8. The bypass control device recited in claim 1 wherein said centrifugal member is a resilient member.

9. The bypass control device recited in claim 1 wherein said passage means communicates said seat means with said low pressure portion for supplying fluid from said low pressure portion to said seat means.

10. The bypass control device recited in claim 1 wherein said passage means comprises a first fluid passage for supplying fluid from said high pressure portion to said cavity means, and a second fluid passage for supplying fluid from said low pressure portion to said seat means.

References Cited by the Examiner

UNITED STATES PATENTS

| 2,377,350 | 6/1945 | Marsh | 137—56 X |
| 2,571,063 | 10/1951 | Roth | 192—58 |
| 3,116,617 | 1/1964 | Skoog | 64—26 |
| 3,191,404 | 6/1965 | Schivley | 64—26 |

FRED C. MATTERN, JR., *Primary Examiner.*

HALL C. COE, *Examiner.*